Patented Feb. 26, 1929.

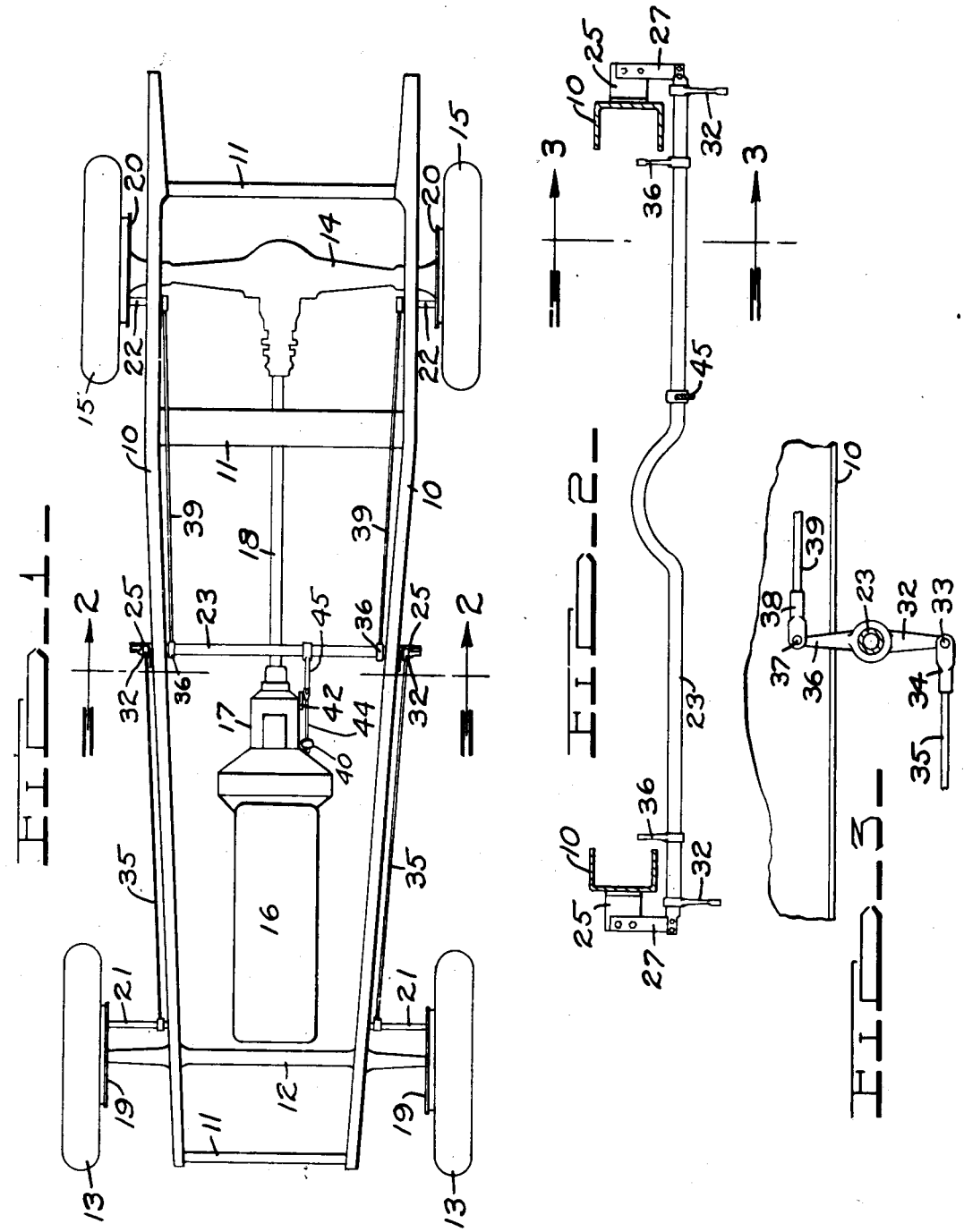

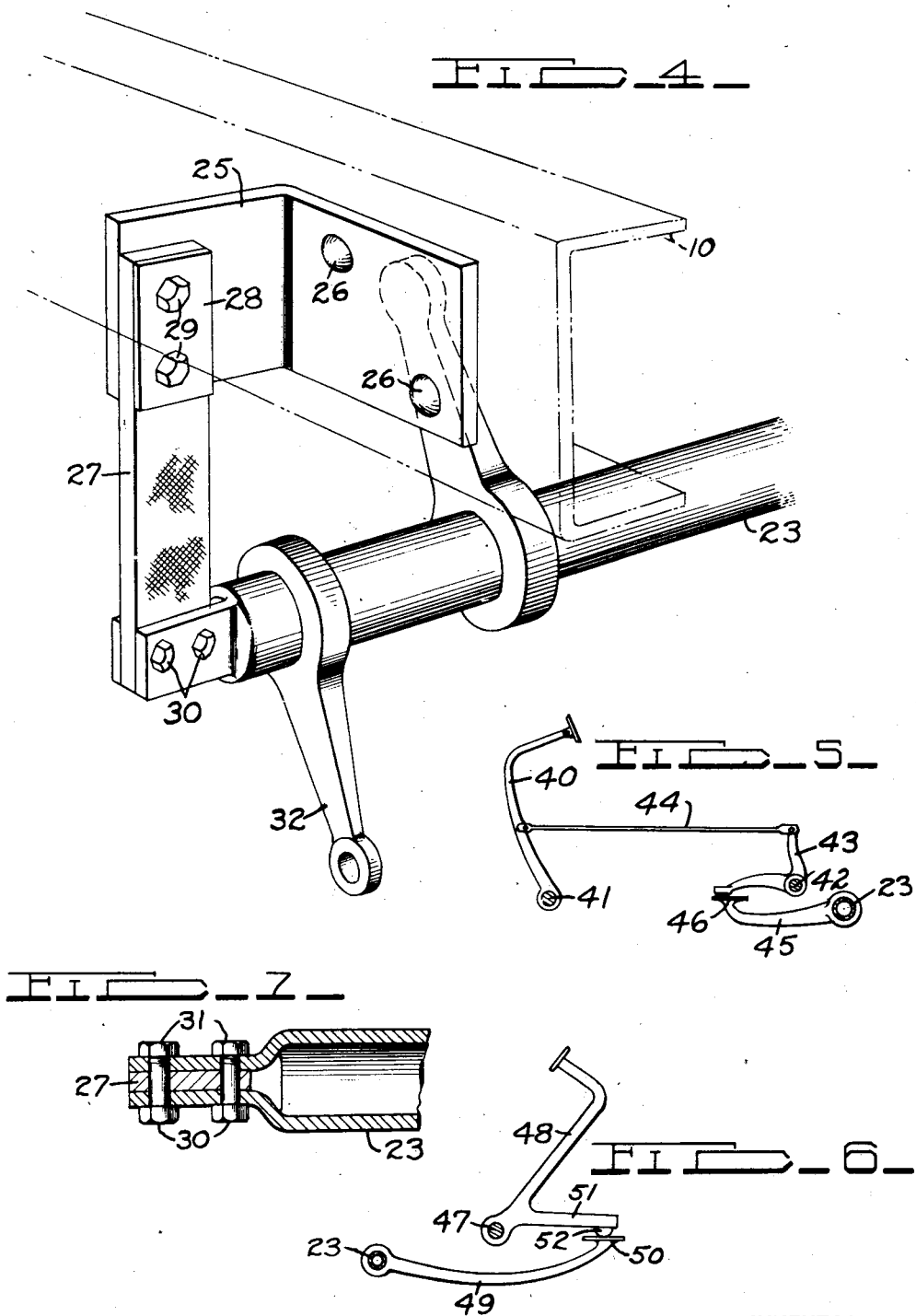

1,703,828

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed December 3, 1926. Serial No. 152,457.

This invention relates to motor vehicles and particularly to the brakes therefor, the principal object being the provision of novel means for applying the brakes on all four wheels thereof.

Another object is to provide, in combination with the braking mechanism of a motor vehicle, a rotatable brake cross shaft supported for bodily movement by flexible means.

Another object is to provide in combination with a motor vehicle having four wheel brakes, a brake cross shaft mounted for bodily movement connected to said brakes, and means for causing rotation of said cross shaft without restricting the bodily movement thereof.

Another object is to provide in combination with a motor vehicle having four wheel brakes, a brake cross shaft depending from flexible strips whereby to be capable of bodily movement, a connection between said cross shaft and said brake, and means for allowing bodily movement of said cross shaft in the operation of applying said brakes.

Another object is to provide in combination with a motor vehicle having four wheel brakes, a cross shaft supported at its ends solely by a depending strip of flexible fabric, connections between said cross shaft and all of said brakes, and a slidable connection between said cross shaft and a foot pedal for causing rotation of said shaft without restricting the bodily movement thereof.

A further object is to provide in combination with a motor vehicle having four wheel brakes, a brake cross shaft supported at its end solely by depending strips of flexible material, said cross shaft being operatively connected to all said brakes and being provided with an extending arm, and a lever operatively connected to a foot pedal slidably engaging said arm whereby to cause rotation of said shaft and allowing said shaft to move bodily without affecting the action of said pedal thereon.

The above being among the objects of the present invention the same consists in certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views, Figure 1 is a diagrammatic plan view of a motor vehicle chassis in which an embodiment of the present invention is incorporated.

Figure 2 is a sectional view taken on the line 2—2 of Figure 1.

Figure 3 is a sectional view taken on the line 3—3 of Figure 2.

Figure 4 is a fragmentary perspective view showing the manner of supporting the end of the brake operating cross shaft.

Figure 5 is a side view showing the manner in which the brake cross shaft is connected to the brake pedal for relative movement therewith.

Figure 6 is a view similar to Figure 5 showing a modified manner of connecting the brake pedal with the cross shaft.

Figure 7 is a fragmentary sectional view taken horizontally through the end of the brake cross shaft, showing the manner of securing the flexible supporting strip thereto.

The chassis shown in Figure 1 comprises frame side members 10, frame cross members 11, front axle 12, front wheels 13, rear axle 14, and rear wheels 15. The engine 16 is connected to the rear axle 14 through the conventional transmission 17 and propeller shaft 18. Each front wheel 13 is provided with a brake drum 19 and each rear wheel 15 is provided with a similar brake drum 20. The brakes shown for the purpose of illustration may be considered as of the conventional internal expanding type, operated by rotating the shafts 21 at the front wheels and the shafts 22 at the rear wheels. Extending transversely of the vehicle just rearwardly of the transmission 17 is a brake cross shaft 23 supported as best shown in Figures 2 and 4. An L-shaped bracket 25 is secured to the frame side members 10 directly above each end of the cross shaft 23, one leg of these brackets 25 being secured to the corresponding frame side member 10 by rivets 26 or other suitable means, and the other leg thereof projecting outwardly from the frame side member 10. A strip of resilient material 27, which may be fabric, preferably of the rubber impregnated type, is secured to the outwardly projecting portion of each bracket 25 by means of a metal plate 28 and screws 29. The lower ends of the strips 27 which project downwardly from the bracket 25, are secured to the ends of the cross shaft 23. In the particular embodiment of the cross shaft 23 shown, the same is of tubular material and diametrically opposite portions of each end thereof are removed and the sides flattened out and brought into adjacent relationship to form a yoke end. The lower ends of the strips 27 are received between the yoke ends of the cross shaft 23 and screws 30 are passed through the yoke ends and the fabric 27 and such ends are brought together to fasten the fabric therebetween by nuts 31 threaded on to the screws 30. It will thus be seen that the cross shaft 23 is supported solely by the strips 27 which, being flexible, allow the shaft 23 to move bodily longitudinally of the vehicle within limits restricted by the length and flexibility of the strip 27.

Secured adjacent the outer ends of the cross shaft 23, as shown in Figure 3, are downwardly extending levers 32, the free ends of which are connected by means of pins 33 and clevises 34 to the brake rods 35 which extend forwardly and are suitably connected to the front brake operating shafts 21. Secured to each end of the shaft 23 just inside of the frame member 10, are upwardly extending levers 36, the free ends of which are connected by means of the pins 37 and clevises 38 to the brake rods 39 which extend rearwardly and are suitably connected to the operating shafts 22 for the rear wheel brakes.

A foot pedal 40 is movably mounted for pivotal movement on the shaft 41 supported in any suitable manner as by the side of the transmission case 17. Pivotally mounted on a bracket 42 carried by the extreme rear end of the transmission 17 is a bell crank 43 having an upwardly extending arm and a forwardly extending arm. The upper end of the upwardly extending arm of the bell crank 43 is operatively connected to the pedal 40 above the shaft 41 by the link 44. Secured to the shaft 23 in longitudinal alignment with the pedal 40 is a lever 45 extending forwardly and terminating in an upwardly exposed disc face 46 against which the free end of the forwardly extending arm of bell crank 43 is adapted to rest in sliding relation therewith. When the foot pedal 40 is depressed in the operation of applying the brakes, the link 44 is moved forwardly, carrying with it the upper end of the upwardly extending arm of the bell crank 43, causing the free end of the forwardly extending arm of the bell crank 43 to move downwardly. When the free end of the forwardly extending arm of the bell crank 43 thus moves downwardly it forces the free end of the lever 45 downwardly a corresponding amount and causes rotation of the shaft 23. When the shaft 23 is thus rotated the lower ends of the lever 32 are moved rearwardly, carrying with them the rods 35, thus causing rotation of the front wheel brake operating shafts 21 and applying the front wheel brakes. At the same time the upper ends of the levers 36 are caused to move forwardly carrying with them the rods 39 and consequently causing a rotation of the rear wheel brake operating shafts 22 and consequent application of the rear wheel brakes. Should the rear wheel brakes take up before the front wheel brakes the shaft 23 will be caused to move bodily rearwardly until the front wheel brakes are taken up in an amount corresponding to the rear wheel brakes after which the pressure from the pedal 40 will be transmitted equally to all the brakes. Although this construction does not provide for equalization between the brakes on one side of the vehicle against the brakes on the other side except through deflection of the shaft 23, any unequalization may be readily taken care of by adjusting the clevises 34 or 38 on the rods 35 and 39 respectively by threading them forwardly or rearwardly thereon.

When, in the application of the brakes, the cross shaft 23 shifts bodily to effect an equalization of pressure to the different brakes, it will be apparent that the point of contact between the forward end of the forwardly extending arm of the bell crank 43 and the disc face 46 of the lever 45 will shift therewith. The disc face 46 is provided to allow this movement without disengaging the bell crank 43 from the lever 45, the contacting end of the bell crank being freely slidable thereon so that it may transmit pressure to the end 46 at any point on its surface. It is preferable in order to facilitate ease of sliding, to provide the end of the forwardly extending arm of the bell crank 43 with a spherical surface whereby the same has point contact at all times with the face 46.

In Figure 6 is shown a modified manner of operating the shaft 23 from the brake pedal. In this case the cross shaft 23 and supporting shaft 47 for the brake pedal 48 are brought into closer relationship. An arm 49 is non-rotatably secured to the shaft 23 and extends forwardly under the shaft 47 to a point substantially forward thereof where it terminates in an upwardly extending disc face 50 similar to the disc face 46 previously described. Secured to or formed with the pedal 48 is a forwardly extending arm 51 which terminates in a downwardly disposed spherical portion 52 which contacts with the face 50. Depression of the pedal 48 thus transmits a rotary movement to the shaft 23 directly through the arms 51 and 49 and eliminates the necessity of a link and bell crank as used in the previously explained construction, without losing any of the advantages thereof.

In both of these constructions it will be noted that the force transmitted, from the foot pedals to the co-operating arms on the cross-shaft is transmitted downwardly, this being necessary to keep the fabric strips 27 in tension and for preventing the shaft 23 from vertical displacement.

It will be noted that the construction described provides an exceedingly simple and economical arrangement for operating the brakes of a motor vehicle, and that there are no bearings for the cross shaft 23 which require lubrication.

In addition a construction is provided which allows ready adjustment of the brakes to compensate for wear or unequal distribution of the braking forces.

Formal changes may be made in the specific embodiment of the invention described without departing from the spirit and substance of the broad invention, the scope of which is commensurate with the appended claims.

What I claim is:—

1. In a brake mechanism for a motor vehicle having brakes on all four wheels thereof, a bodily shiftable cross shaft, a foot pedal, connections between said cross shaft and said brakes, and means connecting said cross shaft and said pedal for causing rotation of said cross shaft comprising a pair of members slidably engaging each other.

2. In a brake mechanism of a motor vehicle, flexible members depending from the frame of said vehicle, a brake cross shaft entirely supported by said members, brakes on all wheels of said vehicle, connections between said brakes and said cross shaft, a foot pedal, and means connecting said pedal to said shaft for causing rotation thereof comprising a pair of members having sliding contact with each other.

3. In a motor vehicle, a strip of fabric carried by each frame side member thereof and depending therefrom, a brake cross shaft carried by the lower ends of said strips whereby to be bodily movable longitudinally of said vehicle, a foot pedal, and a sliding connection between said cross shaft and said pedal.

4. In a motor vehicle equipped with brakes on all four wheels, a bodily shiftable rock-shaft disposed transversely of said vehicle, connections between said rock-shaft and said brakes, a lever secured to said rock shaft, a foot pedal, and a lever movable by said pedal in sliding contact with the first-mentioned lever whereby to cause rotation of said rock shaft upon depression of said pedal without restricting said bodily shiftable movement of said rock shaft.

5. In a motor vehicle, a brake cross shaft, a foot pedal, a horizontally extending lever on said cross shaft in longitudinal alignment with said pedal, and a horizontally extending lever actuated by said pedal, the free ends of said levers having sliding contact with each other whereby actuation of said pedal causes actuation of said cross shaft.

6. In a motor vehicle, a transverse brake cross shaft supported for bodily movement longitudinally of said vehicle, a forwardly extending lever secured to said cross shaft and terminating at its free end in a flat face, a lever pivotally mounted independently of the first-mentioned lever between the ends of said first-mentioned lever and having its end contacting against said flat face, a brake pedal, and means for causing movement of the last-mentioned lever upon depression of said pedal whereby to actuate said cross shaft.

7. In a brake mechanism for a motor vehicle having side frame members and front and rear wheel brakes, a brake cross shaft, means for supporting said shaft comprising brackets secured to said frame members and projecting therefrom, and fabric strips having their broad faces secured to said projecting portions on said brackets and to said cross shaft to permit movement of said shaft longitudinally of said vehicle, and means slidably engaging an arm on said shaft for causing rotation of said shaft without restricting said movement.

8. In a brake mechanism for a motor vehicle having side frame members and front and rear wheel brakes, a cross shaft having yoke ends, fabric strips each secured at one end to said frame members with the faces thereof parallel with the axis of said shaft and at the opposite end to the yoke ends of the said shaft to support said shaft and provide movement thereof longitudinally of said vehicle, and means slidably engaging an arm on said shaft for causing rotation of said shaft without restricting said movement.

9. In a motor vehicle, a brake cross shaft mounted on flexible strips adjacent its ends to permit bodily shiftable movement of said shaft, and means comprising a pair of members slidably engaging each other for causing rotation of said shaft without restricting the bodily shiftable movement of said shaft.

10. In a motor vehicle, a bodily shiftable brake cross shaft having an arm secured thereto, and means for rotating said shaft comprising an actuating member, and an arm operatively connected therewith slidably engaging said first-mentioned arm.

11. In a motor vehicle, a bodily shiftable brake cross shaft having an arm secured thereto, means for rotating said shaft without restricting the bodily shiftable movement thereof comprising an actuating member having means operatively connected therewith for slidably engaging the arm of said cross shaft.

12. In a motor vehicle, a brake cross shaft mounted on flexible strips adjacent its ends to permit bodily shiftable movement of said shaft, an arm mounted on said shaft intermediate its ends, and means slidably engaging said arm for rotating said shaft without restricting the shiftable movement thereof.

13. In a motor vehicle, a bodily shiftable brake cross shaft having an arm secured thereto, and means slidably engaging said arm for rotating said shaft without restricting the bodily shiftable movement of said shaft.

Signed by me at Detroit, Michigan, this 29 day of November, 1926.

VINCENT LINK.